(12) United States Patent
Wang et al.

(10) Patent No.: US 12,312,975 B2
(45) Date of Patent: *May 27, 2025

(54) COMPONENT FOR A TURBINE ENGINE WITH A COOLING HOLE

(71) Applicant: General Electric Company, Schenectady, NY (US)

(72) Inventors: Anquan Wang, Mason, OH (US); Ryan Christopher Jones, Cincinnati, OH (US); Paul Christopher Schilling, Waynesville, OH (US); Craig Alan Gonyou, Blanchester, OH (US)

(73) Assignee: General Electric Company, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/536,428

(22) Filed: Dec. 12, 2023

(65) Prior Publication Data

US 2024/0102392 A1 Mar. 28, 2024

Related U.S. Application Data

(63) Continuation of application No. 17/068,235, filed on Oct. 12, 2020, now Pat. No. 11,873,734, which is a
(Continued)

(51) Int. Cl.
  *F01D 5/18* (2006.01)
(52) U.S. Cl.
  CPC .................................. *F01D 5/186* (2013.01)

(58) Field of Classification Search
  CPC .......... F01D 5/186; F01D 9/065; F01D 5/187; F01D 9/023; F01D 25/12; F01D 9/041;
  (Continued)

(56) References Cited

U.S. PATENT DOCUMENTS

| 3,527,543 | A | 9/1970 | Howald |
| 4,705,455 | A | 11/1987 | Sahm et al. |

(Continued)

FOREIGN PATENT DOCUMENTS

| CN | 106401654 A | 2/2017 |
| CN | 106437866 A | 2/2017 |
| CN | 107084050 A | 8/2017 |

*Primary Examiner* — Eric J Zamora Alvarez
(74) *Attorney, Agent, or Firm* — McGarry Bair PC

(57) ABSTRACT

An apparatus relating to a component for a turbine engine which generates a hot gas fluid flow, and provides a cooling fluid flow. The component having a wall separating the hot gas fluid flow from the cooling fluid flow and having a heated surface along which the hot gas fluid flow flows and a cooled surface facing the cooling fluid flow. At least one cooling hole including a connecting passage extending from a first inlet located at the cooled surface, to a first outlet located at the heated surface, the connecting passage defining a downstream flow direction from the first inlet to the first outlet, the connecting passage comprising a metering section fluidly coupled to the first inlet and defining a metered centerline and a diffusing section, downstream of the metering section, defining a diffused centerline, and fluidly coupling the metering section to the first outlet.

19 Claims, 9 Drawing Sheets

Related U.S. Application Data continuation of application No. 16/249,285, filed on Jan. 16, 2019, now Pat. No. 10,822,958.

(58) Field of Classification Search
CPC . F01D 5/18; F01D 5/141; F01D 5/147; F01D 5/185; F01D 5/189; F05D 2260/202; F05D 2240/81; F05D 2250/324; F05D 2250/12; F05D 2250/314; F05D 2240/12; F05D 2220/32; F05D 2240/30; F05D 2240/127; F05D 2250/131; F05D 2250/23; F04D 29/023; F04D 29/584; Y02T 50/60
See application file for complete search history.

(56) References Cited

U.S. PATENT DOCUMENTS

| | | | |
|---|---|---|---|
| 4,762,464 A | 8/1988 | Vertz et al. | |
| 4,770,608 A | 9/1988 | Anderson et al. | |
| 6,234,755 B1 | 5/2001 | Bunker et al. | |
| 7,708,525 B2 | 5/2010 | Cherolis | |
| 7,820,267 B2 | 10/2010 | Fahndrich | |
| 7,883,320 B2 | 2/2011 | Pietraszkiewicz et al. | |
| 8,683,813 B2 * | 4/2014 | Xu | F01D 9/065 |
| | | | 415/115 |
| 8,905,713 B2 | 12/2014 | Bunker et al. | |
| 8,961,136 B1 | 2/2015 | Liang | |
| 9,200,522 B2 | 12/2015 | Roy | |
| 9,416,665 B2 | 8/2016 | Xu et al. | |
| 9,957,811 B2 | 5/2018 | Hucker et al. | |
| 10,024,169 B2 | 7/2018 | Bunker | |
| 10,030,525 B2 * | 7/2018 | Bergholz | F01D 5/186 |
| 10,280,763 B2 | 5/2019 | Torkaman et al. | |
| 10,822,958 B2 | 11/2020 | Wang et al. | |
| 2006/0073015 A1 | 4/2006 | Liang | |
| 2006/0171807 A1 | 8/2006 | Lee | |
| 2013/0205783 A1 | 8/2013 | Kohli et al. | |
| 2013/0205793 A1 | 8/2013 | Xu | |
| 2013/0205801 A1 * | 8/2013 | Xu | F01D 9/065 |
| | | | 29/889.22 |
| 2014/0161585 A1 | 6/2014 | Arness et al. | |
| 2015/0377033 A1 * | 12/2015 | Xu | F23R 3/02 |
| | | | 415/177 |
| 2016/0097285 A1 | 4/2016 | Harding et al. | |
| 2016/0245094 A1 | 8/2016 | Bunker et al. | |
| 2016/0273364 A1 | 9/2016 | Bergholz | |
| 2017/0114646 A1 | 4/2017 | Sreekanth et al. | |
| 2017/0234225 A1 | 8/2017 | Bunker et al. | |
| 2017/0356294 A1 | 12/2017 | Torkaman et al. | |
| 2018/0258518 A1 * | 9/2018 | Dutta | B33Y 80/00 |

* cited by examiner

COMPONENT FOR A TURBINE ENGINE WITH A COOLING HOLE

CROSS REFERENCE TO RELATED APPLICATION

This application is a continuation of U.S. patent application Ser. No. 17/068,235 filed Oct. 12, 2020, now U.S. Pat. No. 11,873,734, which is a continuation of U.S. patent application Ser. No. 16/249,285 filed Jan. 16, 2019, now U.S. Pat. No. 10,822,958 which are now incorporated herein in their entirety.

BACKGROUND OF THE INVENTION

Turbine engines, and particularly gas or combustion turbine engines, are rotary engines that extract energy from a flow of combusted gases passing through the engine onto a multitude of rotating turbine blades.

Engine efficiency increases with temperature of combustion gases. However, the combustion gases heat the various components along their flow path, which in turn requires cooling thereof to achieve a long engine lifetime. Typically, the hot gas path components are cooled by bleeding air from the compressor. This cooling process reduces engine efficiency, as the bled air is not used in the combustion process.

Turbine engine cooling art is mature and is applied to various aspects of cooling circuits and features in the various hot gas path components. For example, the combustor includes radially outer and inner liners, which require cooling during operation. Turbine nozzles include hollow vanes supported between outer and inner bands, which also require cooling. Turbine rotor blades are hollow and typically include cooling circuits therein, with the blades being surrounded by turbine shrouds, which also require cooling. The hot combustion gases are discharged through an exhaust which may also be lined, and suitably cooled.

In all of these exemplary turbine engine components, thin metal walls of high strength superalloy metals are typically used for enhanced durability while minimizing the need for cooling thereof. Various cooling circuits and features are tailored for these individual components in their corresponding environments in the engine. These components typically include common rows of film cooling holes.

A typical film cooling hole is a cylindrical bore for discharging a film of cooling air along the external surface of the wall to provide thermal insulation against the flow from hot combustion gases during operation. A coating, for example a thermal barrier coating, can be applied to portions of the cooling hole to prevent damage. The coating can contribute to an undesirable stream away from the heated wall rather than along the heated wall, which can lead to flow separation and a loss of the film cooling effectiveness. The geometrical relationship between the coating and the cooling hole can affect engine efficiency and airfoil cooling.

DESCRIPTION OF EMBODIMENTS OF THE INVENTION

Figure 1:
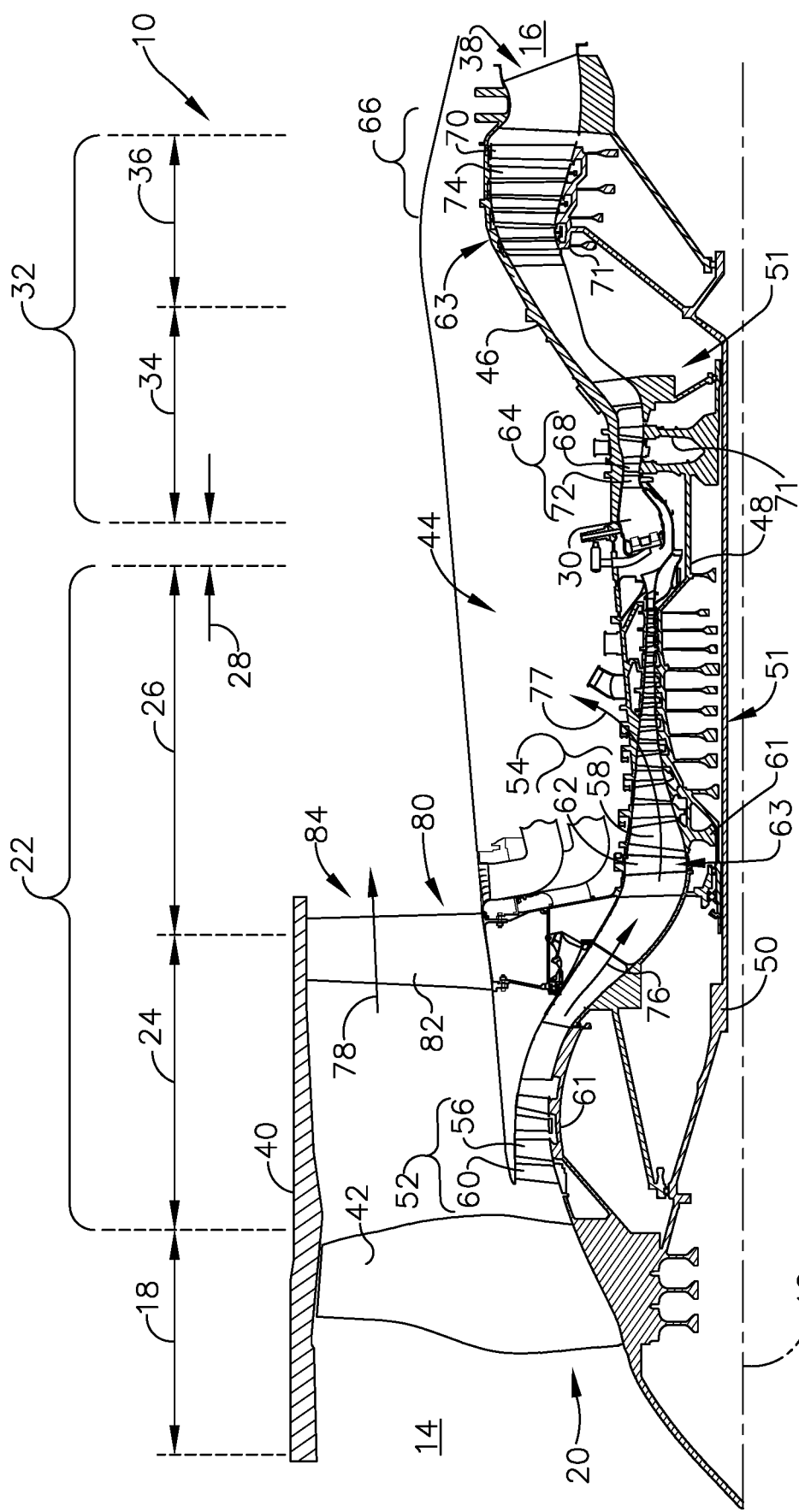
FIG. 1 is a schematic cross-sectional diagram of a turbine engine for an aircraft.

Aspects of the disclosure described herein are directed to the formation of a cooling hole in a wall of an engine component such as an airfoil, or the platform to which an airfoil is mounted. For purposes of illustration, the aspects of the disclosure discussed herein will be described with respect to the platform portion of a blade. It will be understood, however, that the disclosure as discussed herein is not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. Furthermore it should be understood that the term cross section or cross-sectional as used herein is referring to a section taken orthogonal to the centerline and to the general coolant flow direction in the hole. The exemplary drawings are for purposes of illustration only and the dimensions, positions, order and relative sizes reflected in the drawings attached hereto can vary.

Referring to FIG. 1, an engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor mount to a disk 61, which mounts to the corresponding one of the HP and LP spools 48, 50, with each stage having its own disk 61. The vanes 60, 62 for a stage of the compressor mount to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can mount to a disk 71, which is mounts to the corresponding one of the HP and LP spools 48, 50, with each stage having a dedicated disk 71. The vanes 72, 74 for a stage of the compressor can mount to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 splits such that a portion of the airflow is channeled into the LP compressor 24, which then supplies pressurized air 76 to the HP compressor 26, which further pressurizes the air. The pressurized air 76 from the HP compressor 26 mixes with fuel in the combustor 30 where the fuel combusts, thereby generating combustion gases. The HP turbine 34 extracts some work from these gases, which drives the HP compressor 26. The HP turbine 34 discharges the combustion gases into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
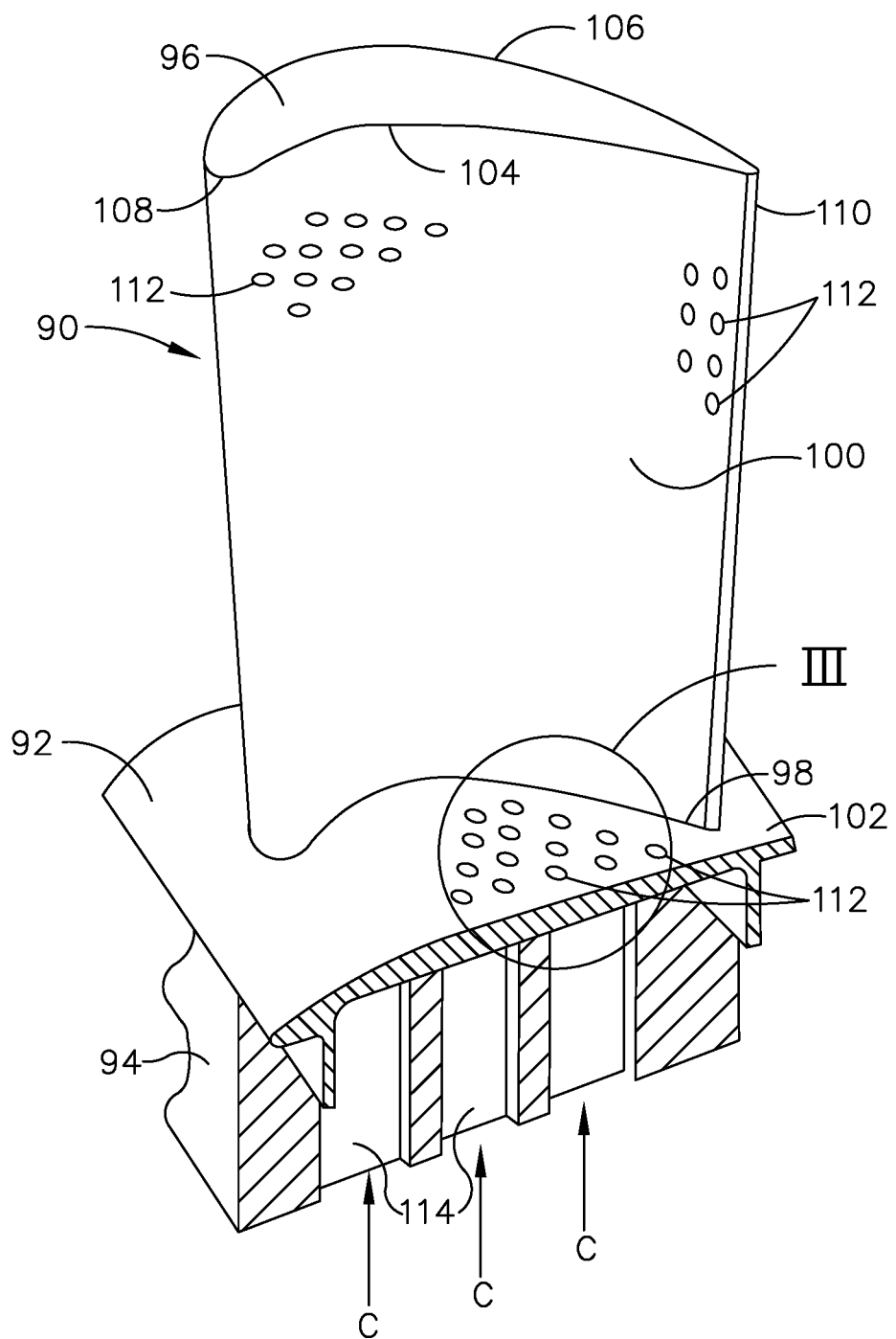
FIG. 2 is an isometric view of an airfoil for the turbine engine of FIG. 1 in the form of a blade and having multiple sets of cooling holes.

FIG. 2 is a perspective view of an example of an engine component illustrated as an airfoil 90, a platform 92, and a dovetail 94, which can be a rotating blade 68, as shown in FIG. 1. Alternatively, it is contemplated that the airfoil 90 can be a stationary vane, such as the vane 72 of FIG. 1, while any suitable engine component is contemplated. The airfoil 90 includes a tip 96 and a root 98, defining a span-wise direction there between. Additionally, the airfoil 90 includes an outer wall 100. A pressure side 104 and a suction side 106 are defined by the airfoil shape of the outer wall 100. The airfoil 90 further includes a leading edge 108 and a trailing edge 110, defining a chord-wise direction.

The airfoil 90 mounts to the platform 92 at the root 98. The platform 92 is shown in section, but can be formed as an annular band for mounting a plurality of airfoils 90. The airfoil 90 can fasten to the platform 92, such as welding or mechanical fastening, or can be integral with the platform 92 in non-limiting examples. A platform wall 102 defines the platform 92.

A set of cooling holes 112 can be formed in any wall of the component including the outer wall 100 or the platform wall 102 as illustrated. The set of cooling holes 112 can be referencing a single cooling hole or multiple cooling holes. The set of cooling holes 112 can be located by way of non-limiting example, proximate the leading edge 108, the trailing edge 110 and be located in the platform 92 on the pressure side 104 of the airfoil 90. It should be understood that the locations of the set of cooling holes 112 is for illustrative purposes only and not mean to be limiting.

The dovetail 94 couples to the platform 92 opposite of the airfoil 90, and can be configured to mount to the disk 71, or rotor 51 of the engine 10 (FIG. 1), for example. In one alternative example, the platform 92 can be formed as part of the dovetail 94. The dovetail 94 can include one or more inlet passages 114, illustrated as three inlet passages 114. It is contemplated that the inlet passages 114 are fluidly coupled to the set of cooling holes 112 to provide a cooling fluid flow (C) for cooling the platform 92. In another non-limiting example, the inlet passages 114 can provide the cooling fluid flow (C) to an interior of the airfoil 90 for cooling of the airfoil 90. It should be appreciated that the dovetail 94 is shown in cross-section, such that the inlet passages 114 are housed within the body of the dovetail 94.

It should be understood that while the description herein is related to an airfoil, it can have equal applicability in other engine components requiring cooling via cooling holes such as film cooling. One or more of the engine components of the engine 10 includes a film-cooled substrate, or wall, in which a film cooling hole, or hole, of the disclosure further herein may be provided. Some non-limiting examples of the engine component having a wall can include blades, vanes or nozzles, a combustor deflector, combustor liner, or a shroud assembly. Other non-limiting examples where film cooling is used include turbine transition ducts and exhaust nozzles.

Figure 3:
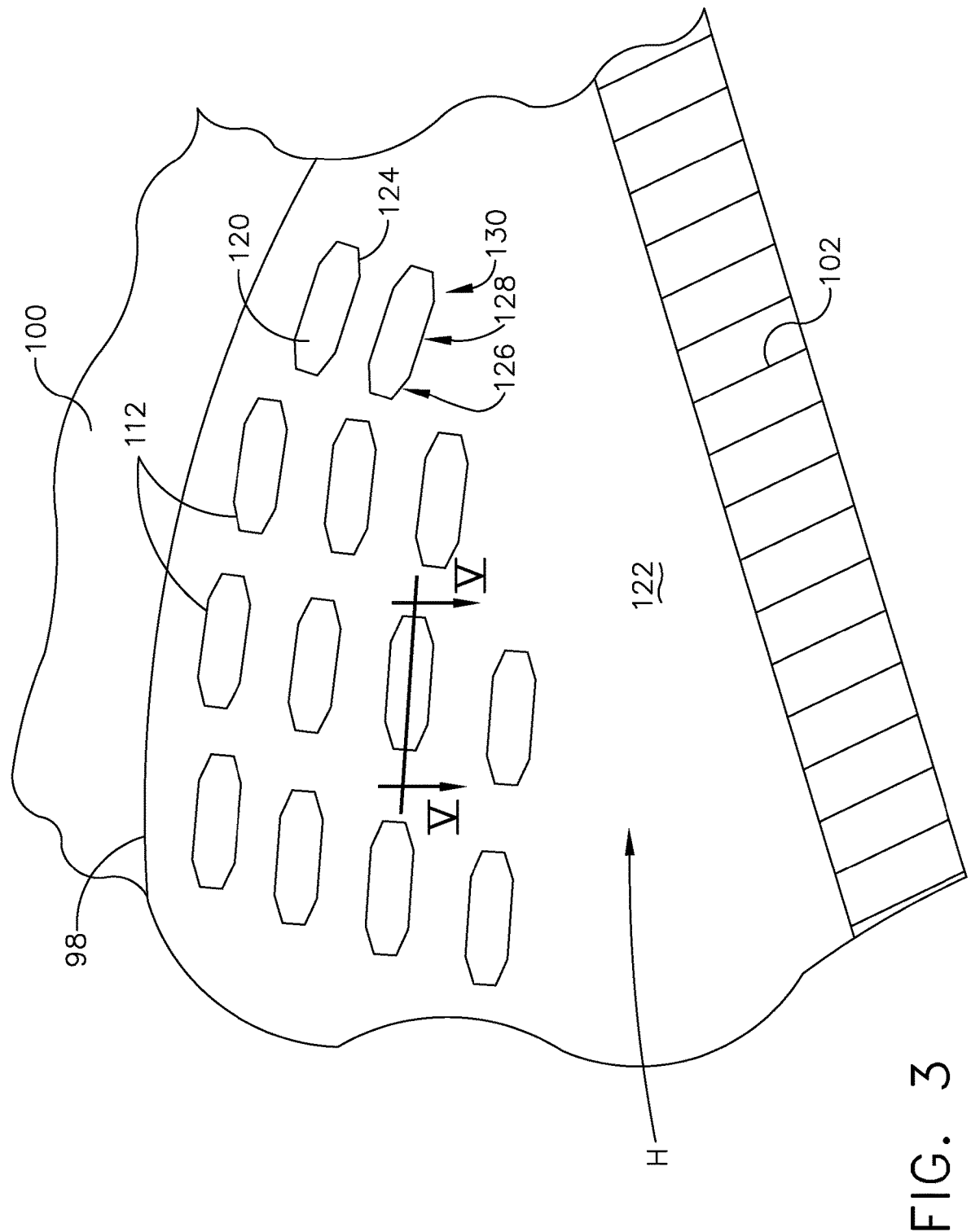
FIG. 3 is an enlarged view of one of the multiple sets of cooling holes located on a platform.

FIG. 3 is an enlarged portion III taken from FIG. 2 of the set of cooling holes 112 located in the platform wall 102. While any number of cooling holes 112 are contemplated, thirteen cooling holes 112 are shown for illustrative purposes only and are not meant to be limiting. Each of the cooling holes terminates in an outlet 120 along a heated surface 122 of the platform wall 102. The heated surface 122 faces a hot gas fluid flow (H) during operation.

The outlet 120 has a modified shape 124 at the heated surface 122. The modified shape 124 can include multiple sections, by way of non-limiting example an expanding section 126, a constant section 128, and a contracting section 130.

Figure 4:
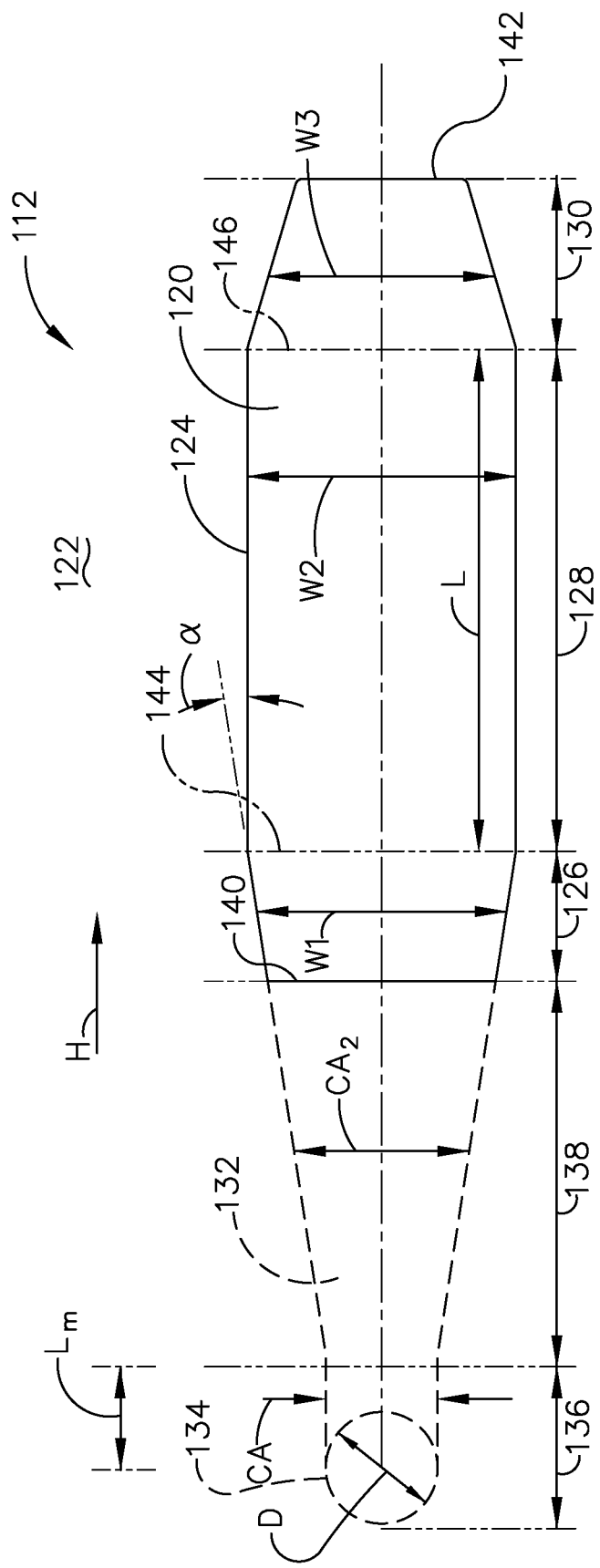
FIG. 4 is a top down perspective of a single cooling hole from the set of cooling holes of FIG. 3 showing an outlet shape according to an aspect of the disclosure herein.

FIG. 4 is an enlarged top down view of at least one cooling hole 112 representative of any of the multiple cooling holes from FIG. 3. The at least one cooling hole 112 can include a connecting passage 132 extending between an inlet 134 and the outlet 120 to define a downstream flow direction from the inlet 134 to the outlet 120. The inlet 134 can be fluidly coupled to any source of the cooling fluid (C) including but not limited to interior cooling circuits and/or cooling conduits. The connecting passage 132 can at least partially define the at least one cooling hole 112 through which the cooling fluid (C) can flow. The inlet 134 can define a diameter (D). It should be understood that if the cross-sectional area of the inlet is of a non-circular shape the diameter (D) is the diameter of a circular cross-sectional area having the same area as the non-circular shape.

The connecting passage 132 can further include a metering section 136 having a circular cross section, though it could have any cross-sectional shape. The metering section 136 can be provided at or near the inlet 134, and extend along the connecting passage 132 while maintaining a constant cross-sectional area (CA). The metering section 136 defines the smallest, or minimum cross-sectional area (CA) of the connecting passage 132. It is further contemplated that the metering section 136 defines the inlet 134 without extending into the connecting passage 132 at all. It is also contemplated that the metering section 136 has no length and is any other location where the cross-sectional area (CA) is the smallest within the connecting passage 132. The metering section 136 can extend a metering length ($L_m$) of between 0 and 1 times the diameter. In an aspect of the disclosure herein the metering section 136 have a metering length ($L_m$) of 0.5D. The metering section 136 is for metering of the mass flow rate of the cooling fluid flow (C).

In another aspect of the disclosure herein, the connecting passage 132 can define an increasing cross-sectional area (CA2) where at least a portion of the increasing cross-sectional area (CA2) defines a diffusing section 138 having a maximum cross-sectional area of the passage. In some implementations the cross-sectional area (CA2) is continuously increasing as illustrated. In yet another implementation the cross-sectional area (CA2) can vary along the extent of the connecting passage 132 to define multiple metering and diffusing sections. The connecting passage 132 can be defined by sidewalls 139 that extend at a side of between 5 and 10 degrees from the metering section 136 toward the outlet 120 to further define the diffusing section. In an aspect of the disclosure herein the side angle α is 7 degrees.

The outlet 120 extends between an upstream end 140 and a downstream end 142 with respect to the hot gas fluid flow (H). The diffusing section 138 can terminate at the expansion section 126 of the outlet 120. The expansion section 126 can extend between the upstream end 140 and a first boundary line 144 delineating a beginning of the constant section 128. The expansion section 126 defines an increasing width (W1) of the outlet 120 increasing in the downstream direction from the upstream end 140 to the first boundary line 144. In some implementations the increasing width (W1) is continuously increasing as illustrated. It is further contemplated that the expansion section 126 of the outlet 120 expands at the same angle α as sidewalls 139 for the diffusing section 138.

The constant section 128 extends in the downstream direction from the first boundary line 144 to a second boundary line 146 delineating an end of the constant section 128. The constant section 128 defines a constant width (W2) maintained along a length (L) between the first and second boundary lines 144, 146. It is contemplated that the increasing width (W1) equals the constant width (W2) at the first boundary line 144.

The contraction section 130 can extend between the second boundary line 146 and the downstream end 142 of the outlet 120. The contraction section 130 defines a decreasing width (W3) of the outlet 120 decreasing in the downstream direction from the second boundary line 146 to the downstream end 142. In some implementations the decreasing width (W3) is continuously decreasing as illustrated.

Figure 5:
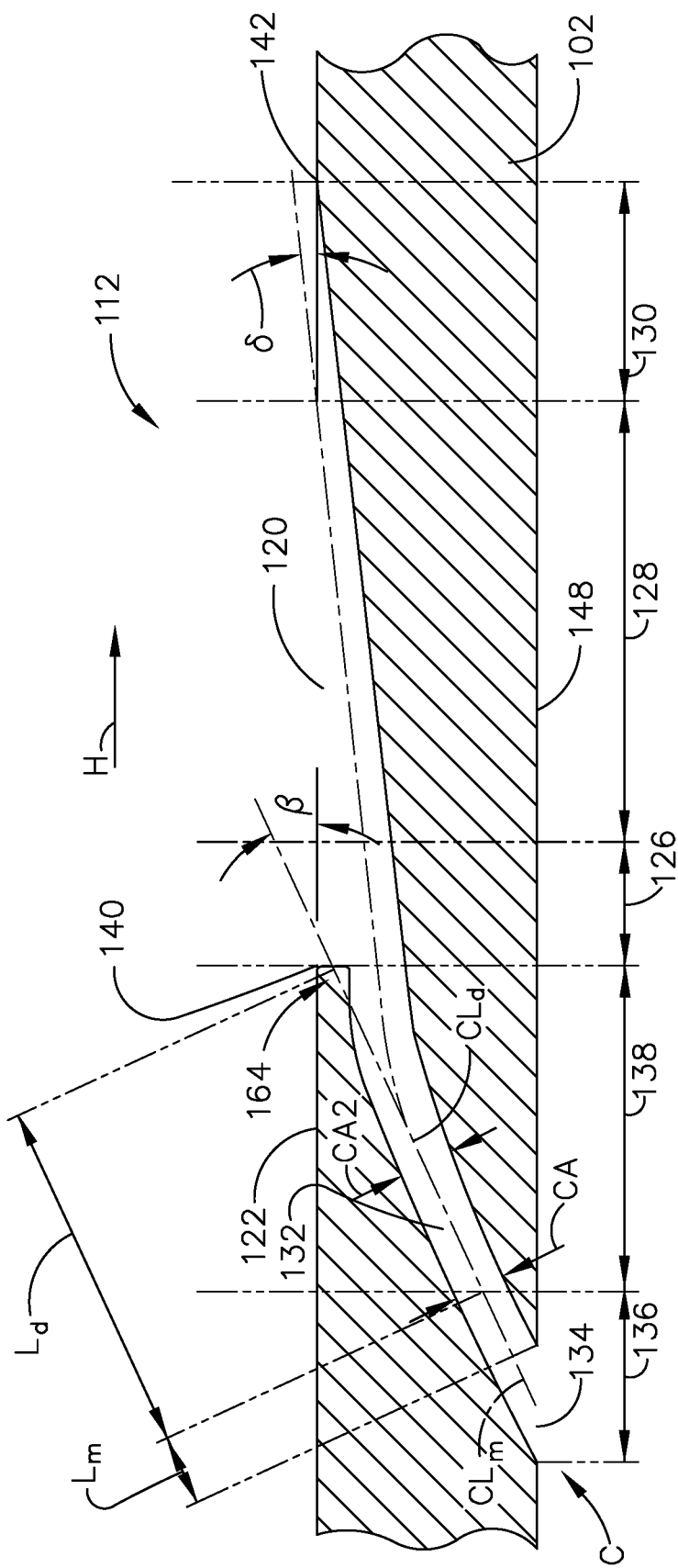
FIG. 5 is a cross-sectional view of the single cooling hole from FIG. 4.

FIG. 5 is a schematic sectional view of the at least one cooling hole 112 taken along V-V in FIG. 3 and extending through the platform wall 102. The platform wall 102 includes the heated surface 122 facing the hot gas fluid flow (H) and a cooled surface 148 facing the cooling fluid (C). It can more clearly be seen that the inlet 134 for the at least one cooling hole 112 is provided on the cooled surface 148 and the outlet 120 is provided on the heated surface 122. It should be understood that the platform wall 102 can be any substrate within the engine 10 including but not limited to the outer wall 100, a tip wall, or a combustion liner wall. Materials used to form the substrate include, but are not limited to, steel, refractory metals such as titanium, or superalloys based on nickel, cobalt, or iron, and ceramic matrix composites. The superalloys can include those in equiaxed, directionally solidified, and crystal structures. The substrate can be formed by, in non-limiting examples, 3D printing, investment casting, or stamping.

It is noted that although the platform wall 102 is shown as being generally planar in FIG. 5, it should be understood that that the platform wall 102 can be curved for many engine components. Whether the platform wall 102 is planar or curved local to the at least one cooling hole 112, the heated and cooled surfaces 122, 148 can be parallel, especially on a local basis, to each other as shown herein, or can lie in non-parallel planes.

As is more clearly illustrated in FIG. 5, the connecting passage 132 can define a metered centerline ($CL_m$) along which the metering length ($L_m$) of the metering section 136 is measured. As is illustrated by an extension of the metered centerline ($CL_m$) to the heated surface 122, an entrance angle β is formed therebetween. It should be understood that the entrance angle β can also be measured between the cooled surface 148 and the metered centerline ($CL_m$). The entrance angle β is between 20 and 40 degrees. In an aspect of the disclosure herein the entrance angle β is 30 degrees.

As the diffusing section 138 extends from the metering section 136 to the outlet 120, the connecting passage 132 can define a diffused centerline ($CL_d$) along which a diffused length ($L_d$) is measured. The diffused centerline ($CL_d$) can be curvilinear and transition between an orientation with the entrance angle β to a layback or exit angle δ. The exit angle δ is less than the entrance angle β. In an aspect of the disclosure herein the exit angle is 10 degrees. Together the diffused centerline ($CL_d$) and the metered centerline ($CL_m$) define a continuous passage centerline for the connecting passage 132.

The at least one cooling hole 112 provides fluid communication between the cooling fluid (C) supply and an exterior of the platform 92. During operation, the cooling fluid flow (C) can be supplied via the inlet passages 114 and exhausted from the set of cooling holes 112 as a thin layer or film of cool air along the heated surface 122. While only one cooling hole is shown in FIG. 5, it is understood that the cross-sectional view can represent any one of or all of the cooling holes in the set of cooling holes 112 of FIG. 3.

It is contemplated that the set of cooling holes 112 as described herein are additively manufactured. An additive manufacturing (AM) process is where a component is built layer-by-layer by successive deposition of material. AM is an appropriate name to describe the technologies that build 3D objects by adding layer-upon-layer of material, whether the material is plastic or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination.

It is contemplated that the diffusing section 138 terminates in a hood 164 and the wall 102 at the heated surface 122 covers at least a portion of the diffusing section 138 prior to the outlet 120. A thickness of the hood 164 can be less than or equal to 0.02 inches before a thermal barrier coating (TBC) is applied and less than 0.05 inches after an application of TBC. Though illustrated as having a thickness at the upstream end 140, it is contemplated that the hood 164 tapers to zero thickness at the upstream end 140.

Figure 6:
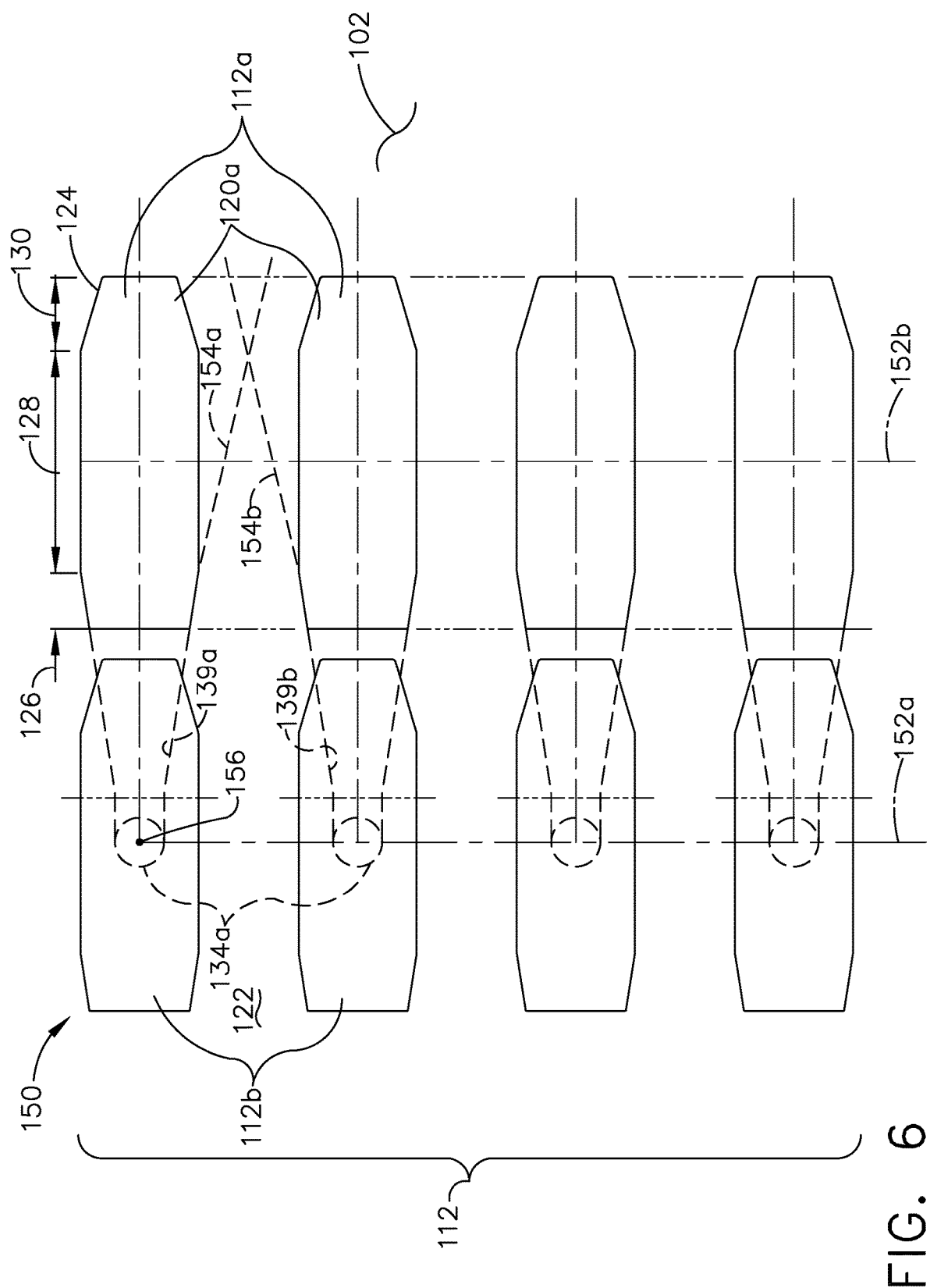
FIG. 6 is a top down perspective of an arrangement of multiple cooling holes with the outlet shape of FIG. 5.

FIG. 6 illustrates a patterned layout 150 for the set of cooling holes 112. Some numbers from previous figures have been eliminated for clarity. The modified shape 124 enables a pattern in which multiple outlets 120 are stacked close together and in-line along dashed line 152 as illustrated. More particularly, both the inlet 134 and the constant section 128 of the outlet 120 are in-line along dashed line 152. Dashed lines 154a, 154b extend from the sidewalls 139a, 139b of exemplary outlets 120a and 120b to illustrate where the outlet 120 can extend to with the constant section 128 eliminated. Truncating a typical diffuser shape of an outlet to form the modified shape 124 enables the formation of tightly spaced and an increasing number of cooling holes 112 in a given space along platform wall 102.

The set of cooling holes 112 can include exemplary cooling holes 112c, 112e. An outlet 120e of cooling hole 112e can be located above an inlet 134c of cooling hole 112c. In other words a geometric center of the inlet 134c and the outlet 120e can be in-line with each other. In this manner outlet 120d is located at the heated surface 122 in a same location as the inlet 134a is spaced from the heated surface 122 within the platform wall 102. Therefore the set of cooling holes 112 as described herein can be stacked, layered, and tightly spaced to increase cooling film effectiveness along the heated surface 122.

A method for forming the set of cooling holes 112 with the modified outlet shape 124 can include forming the set of cooling holes 112 such that the inlet 134 is located on a first surface, by way of non-limiting example the cooled surface 148 described herein and the outlet 120 is formed on a second surface, by way of non-limiting example the heated surface 122 as described herein. The method includes forming the connecting passage 132 to connect the inlet 134 to the outlet 120, by way of non-limiting example using methods already described herein. The outlet 120 is formed with the modified outlet shape 124 having the expansion section 126 and the constant section 128 downstream from the expansion section 126. The method can further include forming the modified shape 124 with the contraction section 130 located downstream from the constant section 128.

The method can further include determining a patterned layout 150 for the set of cooling holes comprising a first line 152a and a second line 152b parallel to the first line 152a. The set of cooling holes 112 can include a first pair of cooling holes 112a having a first pair of inlets 134a in line with the first line 152a. A first pair of outlets 120a are in line with the second line 152b.

The method can further include forming a second pair of cooling holes 112b where a second pair of outlets 120b are formed above the first pair of inlets 134a with respect to the cooled surface 148. In other words while the second pair of outlets 120b are formed in the heated surface 122, the inlets are formed interiorly of the heated surface 122 in the cooled surface 148 and in-line along a geometric center 156 of the first pair of inlets 134a.

Truncating a typical outlet shape to form the modified shape 124 enables the formation of tightly spaced and an increasing number of cooling holes 112 in a given space along platform wall 102. The set of cooling holes 112 can be layered where the inlet 134 is located beneath the outlet 120 of an adjacent cooling hole 112. Therefore the set of cooling holes 112 as described herein can be stacked, layered, and tightly spaced to increase cooling film effectiveness along the heated surface 122.

Figure 7:
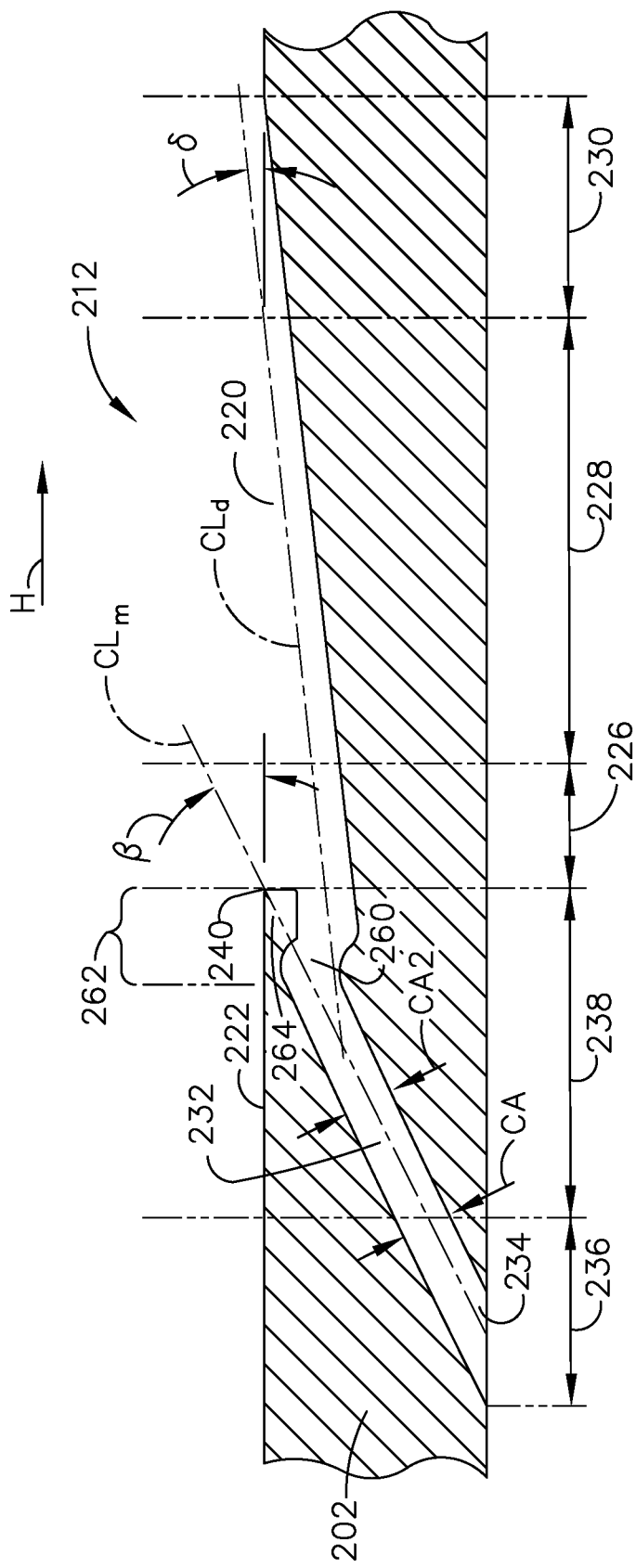
FIG. 7 is a cross-sectional view of a variation of the single cooling hole from FIG. 4.

Turning to FIG. 7, a cooling hole 212 is illustrated in cross-section according to another aspect of the disclosure herein. The cooling hole 212 is similar to the at least one cooling hole 112 therefore, like parts will be identified with like numbers increased by 100, with it being understood that the description of the like parts of the at least one cooling hole 112 applies to the cooling hole 212 unless otherwise noted.

The cooling hole 212 includes all aspects of the at least one cooling hole 112 already described herein and additionally includes a turn 260, or step down feature. Instead of transitioning from the entrance angle β to the exit angle δ gradually, the turn 260 located at or near an outlet 220 of the at least one cooling hole 112 enables an abrupt change in orientation. To transition between an entrance angle β of between 20 and 40 degrees to an exit angle δ of below 20 degrees, by way of non-limiting example a 10 degree exit angle, the abrupt change is defined by the turn 260 immediately upstream from the outlet 220. By abrupt, the turn 260 is illustrated as a step down feature rather than ramped or gradual. Both a metering section 236 and a diffusing section 238 of the at least one cooling hole 212 extend through a wall 202 of an engine component at the same angled orientation. The diffusing section 238 terminates in the turn 260 to define a transition portion 262 where the wall 202 at the heated surface 222 forms a hood 264 covering at least a portion of the diffusing section 238 prior to the outlet 220.

In an aspect of the disclosure herein the method can further include forming the transition portion 262 defining the turn 260 in the diffusing section 238 and upstream from the outlet 220. The cooling fluid (C) fluid as described herein dips 266 or moves suddenly inward before continuing on a more gradual exit angle δ. This can enable near wall cooling at or near the heated surface 222 immediately upstream from the outlet 220.

Figure 8:
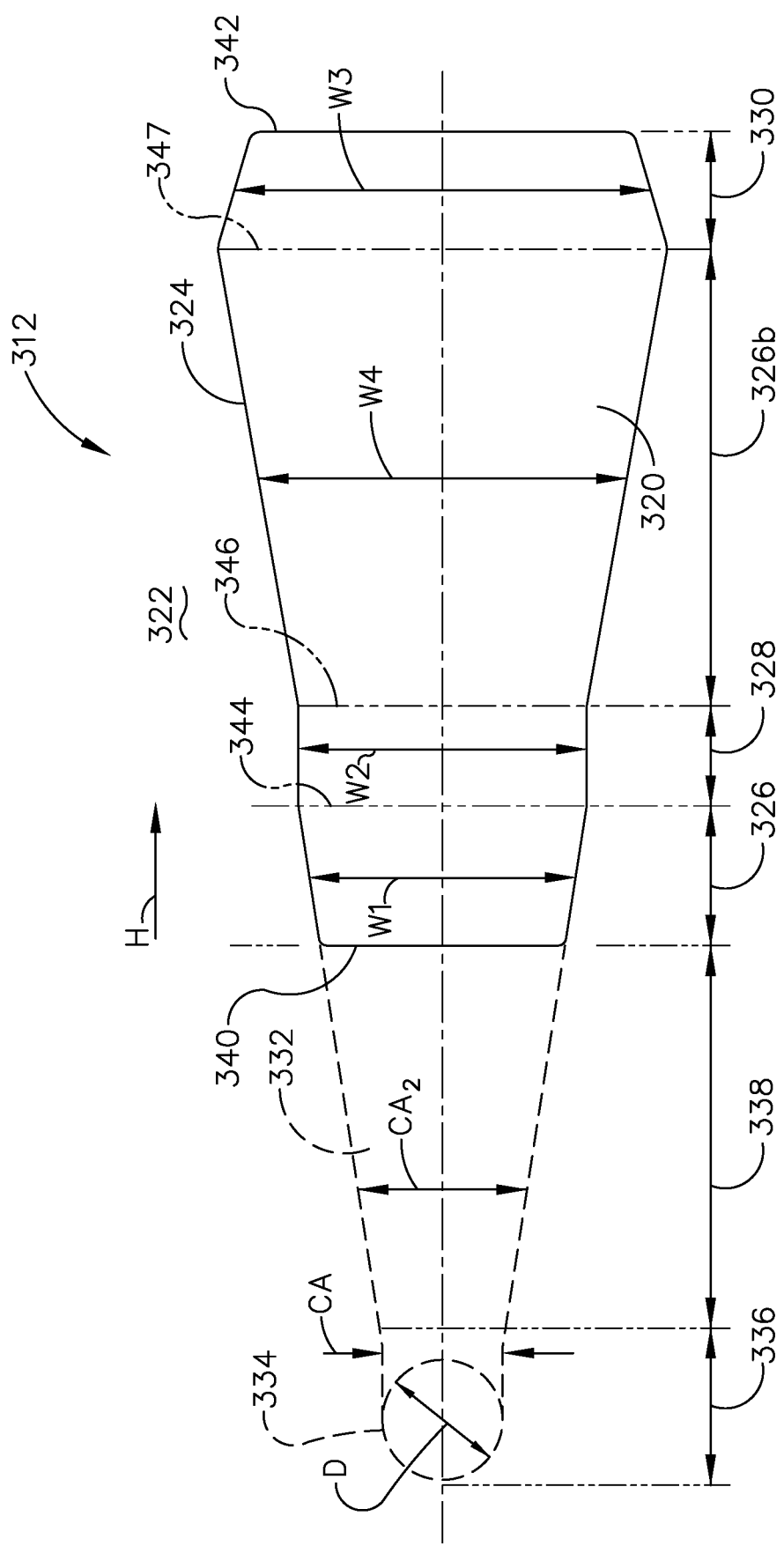
FIG. 8 is a top down perspective of a single cooling hole showing an outlet shape according to another aspect of the disclosure herein.

Turning to FIG. 8, a cooling hole 312 having a modified diffusion shape 324 is illustrated in a top down view according to another aspect of the disclosure herein. The cooling hole 312 is similar to the at least one cooling hole 112 therefore, like parts will be identified with like numbers increased by 200, with it being understood that the description of the like parts of the at least one cooling hole 112 applies to the cooling hole 312 unless otherwise noted.

The cooling hole 312 terminates in an outlet 320 having multiple sections including an expansion section 326, a constant section 326, and a contraction section 330 defining a modified diffusion shape 324. The modified diffusion shape 324 includes all aspects of the modified shape 124 already described herein. Additionally, the modified diffusion shape 324 includes a second expansion section 326b having an increasing width W4 and located downstream from the constant section 328 and upstream from the contraction section 330. The second expansion section 326b can extend between a second boundary line 346 delineating an end of the constant section 328 and a third boundary line 347 delineating an end of the second expansion section 326b. It is contemplated that a maximum width of both the second expansion section 326b and the contraction section 330 are equal to each other (W4=W3) at the third boundary line 347.

In an aspect of the disclosure herein the method can further include forming a second expansion section 326b downstream from the constant section 328 and upstream from the contraction section 330 to define the modified diffusion shape 324.

Figure 9:
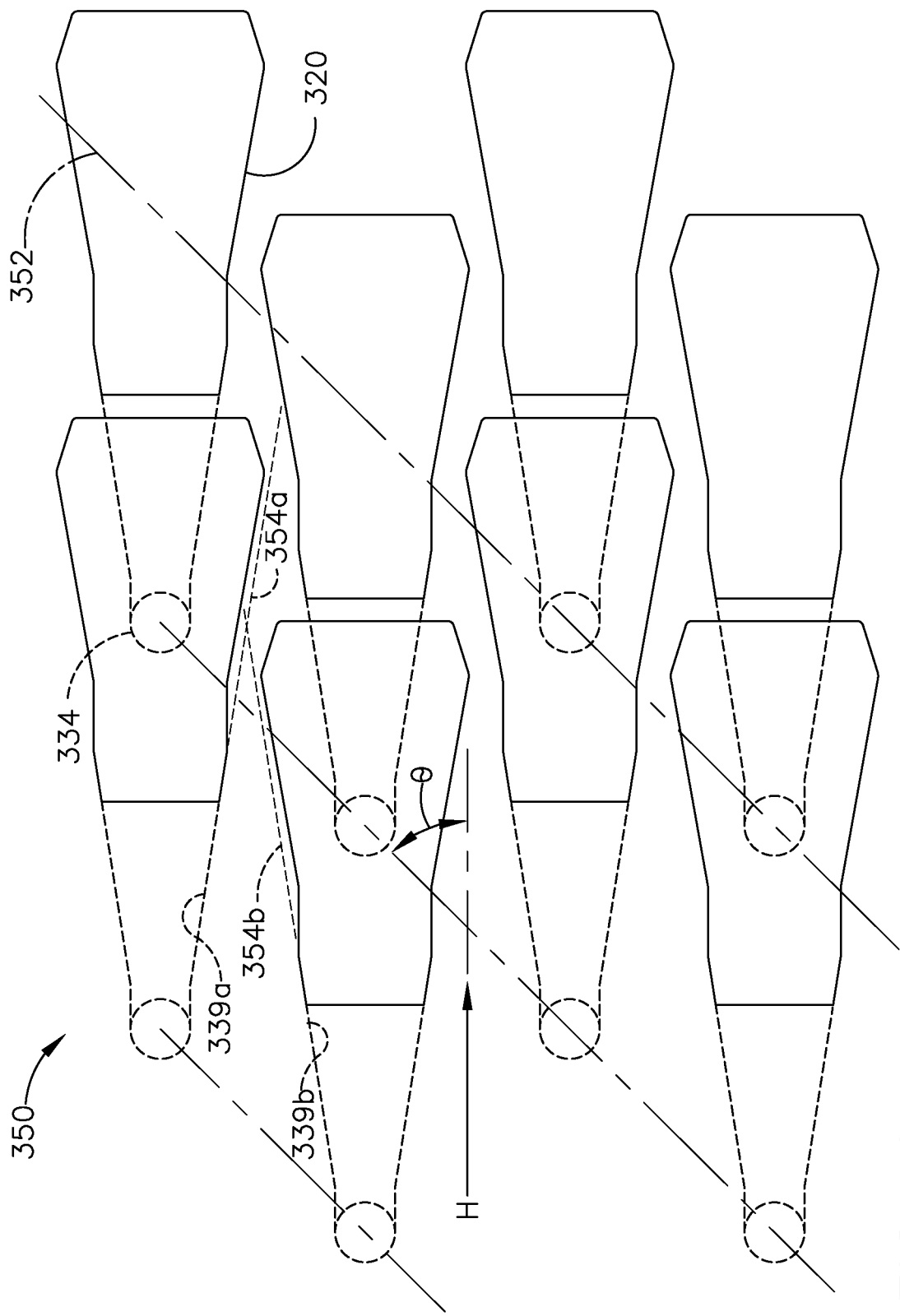
FIG. 9 is a top down perspective of an arrangement of multiple cooling holes with the outlet shape of FIG. 8.

Turning to FIG. 9, an additional patterned layout 370 for the set of cooling holes 312. In an aspect of the disclosure herein the modified diffusion shape 324 enables a staggered pattern where an inlet 334 for each of the cooling holes 112 is in-line with an angled dashed line 352 as illustrated. The angled dashed line 352 is angled with respect to the hot gas fluid flow (H) at some angle θ. Some numbers from previous figures have been eliminated for clarity. The modified diffusion shape 324 enables a pattern in which multiple outlets 320 are staggered close together. Dashed lines 354a, 354b extend from sidewalls 339a, 339b of exemplary outlets 320a and 320b to illustrate where the outlet 320 can extend to with the constant section 328 eliminated. Truncating a typical diffuser shape of an outlet to form the modified diffusion shape 324 enables the formation of tightly spaced and an increasing number of cooling holes 312 in a given space along platform wall 302.

As is already described herein, the set of cooling holes 312 can be layered where the inlet 334 is located beneath the outlet 320 of an adjacent cooling hole 312. Therefore the set of cooling holes 312 as described herein can be stacked, layered, and tightly spaced to increase cooling film effectiveness along the heated surface 322.

It is further contemplated that the method can include determining a patterned layout for the set of cooling holes 312 and forming multiple cooling holes 312 with multiple outlets 320 proximate each other such that the inlet 334 for each of the multiple cooling holes 312 is in-line along the angled line 352.

The outlet shapes as described herein focus and streamline cooling fluid to create a film along the outer wall of an engine component. The patterned and staggered layouts provide uniform cooling to the outer wall. The constant section in particular of the outlet shape as described herein enables the streamlining of the cooling fluid.

Turbine cooling is important in next generation architecture which includes ever increasing temperatures. Current cooling technology needs to expand to the continued increase in core temperature of the engine that comes with more efficient engine design. Optimizing cooling at the surface of engine components by designing cooling hole geometry that streamlines the cooling fluid upon exhausting from the set of cooling holes described herein improves the entire engine performance.

It should be appreciated that application of the disclosed design is not limited to turbine engines with fan and booster sections, but is applicable to turbojets and turbo engines as well.

This written description uses examples to illustrate the disclosure as discussed herein, including the best mode, and also to enable any person skilled in the art to practice the disclosure as discussed herein, including making and using any devices or systems and performing any incorporated methods. The patentable scope of the disclosure as discussed herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A component for a turbine engine which generates a hot gas fluid flow, and provides a cooling fluid flow, comprising:

a wall separating the hot gas fluid flow from the cooling fluid flow and having a heated surface along which the hot gas fluid flow flows and a cooled surface facing the cooling fluid flow; and at least one cooling hole including a connecting passage extending from a first inlet located at the cooled surface, to a first outlet located at the heated surface, the connecting passage defining a downstream flow direction from the first inlet to the first outlet, the connecting passage comprising a metering section fluidly coupled to the first inlet and defining a metered centerline and a diffusing section, downstream of the metering section, defining a diffused centerline, and fluidly coupling the metering section to the first outlet;

wherein the diffusing section terminates in a hood defined at least in part by the wall and covering at least a portion of the diffusing section upstream of the first outlet;

wherein the metered centerline forms an entrance angle with the heated surface;

wherein the diffused centerline forms an exit angle with the heated surface that is less than the entrance angle; and wherein the at least one cooling hole is a set of cooling holes including a first cooling hole and a second cooling hole located downstream from the first cooling hole relative to a direction of the hot gas fluid flow, the second cooling hole comprising a second inlet located at the cooled surface beneath the first outlet and a second outlet located at the heated surface, where the first outlet and the second outlet each define a modified outlet shape.

2. The component of claim 1, wherein the diffused centerline is curvilinear and transitions between an orientation with the entrance angle to an orientation with the exit angle.

3. The component of claim 1, wherein the at least one cooling hole further comprises a step down feature formed as a turn.

4. The component of claim 3, wherein a transition from the entrance angle to the exit angle comprises an abrupt change defined by the turn.

5. The component of claim 4, wherein the hood covers the turn.

6. The component of claim 5, wherein the entrance angle ranges from 20 to 40 degrees.

7. The component of claim 6, wherein the exit angle is less than 20 degrees.

8. The component of claim 1, wherein the modified outlet shape comprises at least one expansion section having an increasing width.

9. The component of claim 8, wherein the modified outlet shape comprises a contraction section downstream of the at least one expansion section and having a decreasing width.

10. The component of claim 9, wherein the modified outlet shape comprises a constant section upstream of the contraction section.

11. The component of claim 10, wherein the entrance angle ranges from 20 to 40 degrees.

12. The component of claim 11, wherein the exit angle is less than 20 degrees.

13. A component for a turbine engine which generates a hot gas fluid flow, and provides a cooling fluid flow, comprising:

a wall separating the hot gas fluid flow from the cooling fluid flow and having a heated surface along which the hot gas fluid flow flows and a cooled surface facing the cooling fluid flow; and at least one cooling hole including a connecting passage extending from a first inlet located at the cooled surface, to a first outlet located at the heated surface, the connecting passage defining a downstream flow direction from the first inlet to the first outlet, the connecting passage comprising a metering section fluidly coupled to the first inlet and defining a metered centerline and a diffusing section, downstream of the metering section, defining a diffused centerline, and fluidly coupling the metering section to the first outlet;

wherein the diffusing section terminates in a hood defined at least in part by the wall and covering at least a portion of the diffusing section upstream of the first outlet;

wherein the metered centerline forms an entrance angle with the heated surface;

wherein the diffused centerline forms an exit angle with the heated surface that is less than the entrance angle; and wherein the at least one cooling hole comprises a first pair of cooling holes and a second pair of cooling holes located downstream from the first pair of cooling holes relative to a direction of the hot gas fluid flow.

14. The component of claim 13, wherein each cooling hole in the first pair of cooling holes comprises a first inlet located at the cooled surface and a first outlet located at the heated surface, the first outlet comprising a modified outlet shape including a constant section, and wherein each cooling hole in the second pair of cooling holes comprises a second inlet located at the cooled surface beneath the first outlet and a second outlet located at the heated surface, the second outlet comprising the modified outlet shape.

15. The component of claim 14, wherein the modified outlet shape comprises at least one expansion section having an increasing width.

16. The component of claim 15, wherein the modified outlet shape comprises a contraction section downstream of the at least one expansion section and having a decreasing width.

17. The component of claim 16, wherein the constant section is upstream of the contraction section.

18. The component of claim 17, wherein the constant section enables tight spacing of the first and second pair of cooling holes with respect to each other.

19. The component of claim 18, wherein the first and second pair of cooling holes together form a patterned layout.

* * * * *